United States Patent [19]

Schirmann et al.

[11] 3,883,401
[45] May 13, 1975

[54] PROCESS FOR THE SEPARATION OF KETAZINES FROM THEIR CRUDE SYNTHESIS MIXTURES

[75] Inventors: Jean-Pierre Schirmann, Brignais; Marcel Thevenon, Pierre Benite, both of France

[73] Assignee: Produits Chimiques Ugine Kuhlmann, Paris, France

[22] Filed: Dec. 18, 1973

[21] Appl. No.: 425,865

[30] Foreign Application Priority Data
Dec. 21, 1972  France .............. 72.45576

[52] U.S. Cl. .............. 203/91; 203/37; 203/34; 260/566 B; 423/407
[51] Int. Cl. .............. B01d 3/10
[58] Field of Search .............. 203/34–38, 203/50, 59, 91; 260/566 B; 423/407

[56] References Cited
UNITED STATES PATENTS

| | | |
|---|---|---|
| 2,876,173 | 3/1959 | Nicolaisen .............. 203/37 |
| 3,012,948 | 12/1961 | Howitz et al. .............. 203/59 |
| 3,527,753 | 9/1970 | Needham et al. .............. 260/566 B |
| 3,728,390 | 4/1973 | Jenkins et al. .............. 260/566 B |
| 3,773,831 | 11/1973 | Jeffreys et al. .............. 260/566 B |

FOREIGN PATENTS OR APPLICATIONS
666,079   7/1963   Canada .............. 203/59

*Primary Examiner*—Norman Yudkoff
*Assistant Examiner*—D. Sanders
*Attorney, Agent, or Firm*—Pennie & Edmonds

[57] ABSTRACT

This invention relates to a process for the separation by distillation of ketazines from a crude aqueous synthesis mixture containing them, which comprises adjusting the pH of the mixture to between about 8.5 and 12 by the addition of a base or an acid and distilling the crude reaction mixture during a period of 30 minutes or less at a reduced pressure so that the distillation column base temperature does not exceed about 85°C.

3 Claims, 1 Drawing Figure

Legend

X = Examples 17, 18 & 19
△ = Examples 11, 12, 13, 14 & 15
⊗ = Examples 8 & 9

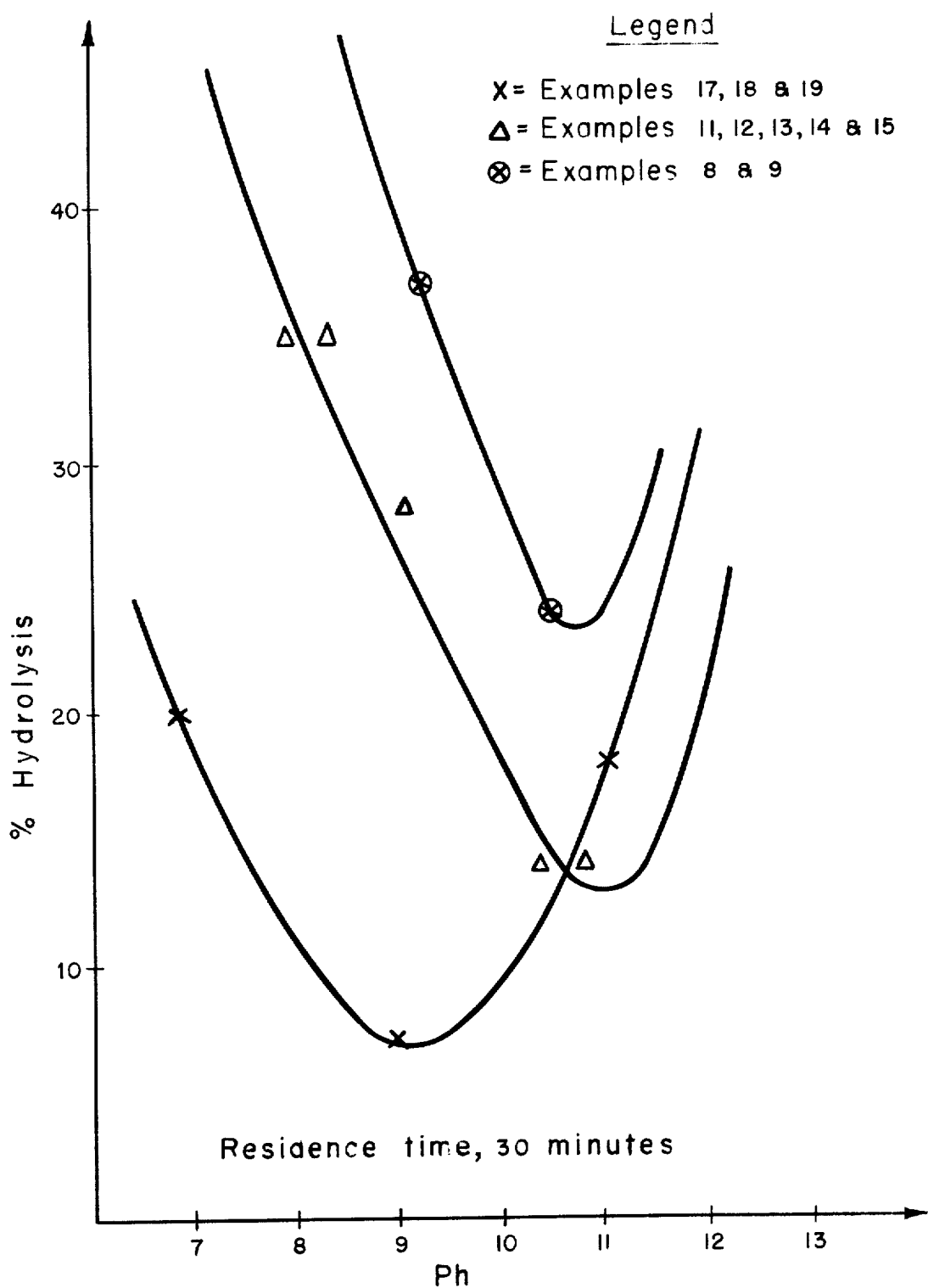

PROCESS FOR THE SEPARATION OF KETAZINES FROM THEIR CRUDE SYNTHESIS MIXTURES

BACKGROUND OF THE INVENTION

I. Field of the Invention

This invention relates to the separation of ketazines and specifically to the separation by distillation of ketazines from crude reaction mixtures.

II. Description of the Prior Art

It is known that ketazines can be prepared by reacting chlorine or an alkali or alkali earth metal hypochlorite with ammonia and simple ketones such as acetone or methylethylketone to yield aqueous solutions containing the ketazines. The ketazines may be separated by distillation from the aqueous media, which are rich in mineral chlorides, and then hydrolyzed to form hydrazine and a ketone by using known methods. The intermediate formation of ketazines in these processes, which are derived from the Raschig process, thus offers a convenient means for separating hydrazine in a combined form (ketazine) from the accompanying salts.

Another group of general syntheses of azines has been discovered and described in previous patent applications of common ownership to this application. This group comprises oxidizing ammonia and a ketone or an aldehyde by means of a peroxide compound according to the reaction

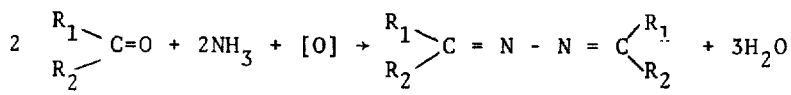

in which $R_1$ and $R_2$ represent a hydrogen atom or various hydrocarbon groups and in which 0 represents the "active" oxygen of the peroxide compound or system used. This formation of azines is consequently accompanied by the formation of a molecule representing the product of the reduction of the oxidizing agent employed. For example, an ammonium salt of a carboxylic acid is obtained when a percarboxylic acid (pending U.S. application Ser. No. 290,507, filed Sept. 20, 1972), an acyl peroxide (pending U.S. application Ser. No. 308,836, filed Nov. 22, 1972) or hydrogen peroxide in the presence of auxiliary reagents such as a carboxylate ester (pending U.S. application Ser. No. 340,763, filed Mar. 13, 1973), or an amide of a carboxylic acid (pending U.S. application Ser. No. 341,057, filed Mar. 14, 1973) is used; the product formed jointly with the azine may be an amide if the oxidation took place with hydrogen peroxide and a nitrile of a carboxylic acid (French Pat. No. 70.21.704 of June 12, 1970, and pending U.S. application Ser. No. 152,413, filed June 11, 1971). All of the above applications are of common ownership to the present application and are incorporated herein by reference. In the processes disclosed in the above applications fractional distillation of the crude reaction mixtures is also an excellent means of separating the azines from the other constituents prior to hydrolyzing the azines with water to obtain hydrazine, or with an acid to obtain a hydrazine salt, or prior to using the azines directly as a synthesis intermediate. This separation is particularly easy with ketazines prepared with lower ketones or with those which form azeotropic mixtures with water, the boiling point of which is lower than that of water itself. That is why, although a large choice of ketones or aldehydes is possible, it is advantageous for simplicity and economic reasons to use a lower dialkyl ketone of the formula

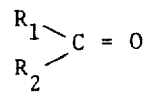

in which $R_1$ and $R_2$ each represent hydrogen or an alkyl radical of from 1 to 3 carbon atoms. The preferred ketones are acetone and methylethylketone.

However, it has been found that ketazines undergo premature hydrolysis of varying magnitude under these conditions, and it may result in the hydrolysis of as much as 50 percent of the ketazine present. This hydrolysis forms the hydrazone of the ketone or hydrazine itself, and these products can no longer be separated from the mixture containing salts or other above-mentioned constituents by simple distillation. The hydrazine in fact forms, for example, an azeotropic mixture with water, the boiling point of which is higher than that of water; thus, it becomes concentrated in the residue during distillation, and its recovery from the residue becomes very difficult and costly.

SUMMARY OF THE INVENTION

This invention relates to a process for recovering ketazines by considerably limiting the hydrolysis of the ketazines by adjusting the pH of the crude reaction media produced by known processes and by the above-disclosed processes to a value between about 8.5 and 12 by the addition of a suitable base when the pH of the medium is too low or by the addition of a suitable acid when the pH of the medium is too high and by distillation of the crude reaction media during a period of 30 minutes or less at a reduced pressure so that the distillation column base temperature does not exceed about 85°C. In fact, the speed of hydrolysis of ketazines surprisingly passes through a marked minimum for the pH values indicated, as is shown in the drawing which illustrates the examples 7 to 19 described below.

The process according to the invention comprises adjusting by the addition of a base or an acid the pH of the crude aqueous synthesis mixture containing a ketazine to a value between about 8.5 and 12 and distilling the crude reaction mixture during a period of 30 minutes or less at a reduced pressure so that the distillation column base temperature does not exceed about 85°C.

DESCRIPTION OF THE PREFERRED EMBODIMENTS

The initial value of the pH of the crude synthesis mixture produced by the process of one of the above-mentioned processes will determine whether it is necessary to add a base, advantageously selected from the hydroxides or carbonates of alkali or alkali earth metals, or an acid, advantageously selected from the mineral hydracids or oxyacids, such as hydrochloric acid, sulphuric acid, phosphoric acid, the alkyl or aryl carboxylic acids, or the alkyl or aryl sulphonic acids having less than 20 carbon atoms (for example, benzene sulphonic acid).

The quantity of base or acid necessary depends on the pH of the solution to be treated and on the pH selected for the distillation according to the process of the invention. This quantity will usually be between about 0.01 and 5 percent by weight of the reaction mixture, but more likely between about 0.1 and 2 percent by weight when producing a ketazine by one or more of the processes described in the above-mentioned applications. The base or acid may be added, where appropriate, directly into the fractional distillation column used for separating the ketazine, advantageously in the upper part of the column, into the feed stream of the column, or even into the immediately preceding synthesis reactor. The base or acid may be added in its pure state or in solution, such as, for example, in water.

The pH of the crude reaction mixture containing a ketazine is adjusted to a value between about 8.5 and 12, advantageously between 9 and 11.

The distillation is carried out under reduced pressure so that the boiling point of the mixtures at the base of the distillation column does not appreciably exceed 85°C. An advantageous pressure range is between 50 and 200mm Hg.

It is advisable for the distillation to be carried out so that the residence time of the liquid phase in the column does not appreciably exceed half an hour and that the distillation column base temperature does not exceed 85°C.

The following examples illustrate the present invention, but do not restrict it. The distillation was carried out in a glass apparatus.

EXAMPLES 1 to 6

The operation was carried out by discontinuous distillation using a residence time of 30 minutes. French Pat. No. 70.21.704 of June 12, 1970, and pending U.S. application Ser. No. 152,413, filed June 11, 1971, describe a method for preparing azines where at least one aldehyde or ketone or a mixture of at least one aldehyde and/or ketone or ketones is reacted with ammonia and hydrogen peroxide in the presence of a nitrile to produce at least one azine. A reaction mixture resulting from the abovedescribed process where acetone was reacted with ammonia and hydrogen peroxide in the presence of acetonitrile was distilled under a reduced pressure of 50mm Hg to separate the acetone at the top of the distillation column. The composition by weight of the mixture was the following: ammonia 0.2 percent, acetone 6.5 percent acetonitrile 4 percent, acetonazine 27 percent, acetamide 18 percent, and water 36 percent. The operating conditions and the results are set out in Table I.

The acetonazine was determined by gas phase chromotography, and the whole of the N — N groupings were determined by iodometry using the method of the French patent and pending U.S. application above where a quantity of reaction mixture containing about 2 milliequivalents of hydrogen peroxide was withdrawn from the reactor and weighed; 12 cm³ of aqueous sulphuric acid (30 percent by weight) and then 12 cm³ of aqueous potassium iodide (30 percent by weight) were added to the mixture; after standing for 15 minutes in darkness, the released iodine was titrated by a decinormal solution of sodium thiosulphate; 50 cm³ of a decinormal acqueous solution of iodine and then 30g of crystallized sodium acetate were added to adjust the pH of the sample to about 5; the sample was stirred and nitrogen evolved for about two minutes; and the excess iodine was titrated by a decinormal solution of sodium thiosulphate.

The percent of hydrolysis is defined by the formula $$\% \text{ hydrolysis} = \frac{\text{chemistry azine - chromato azine}}{\text{chemistry azine}}$$

TABLE I

| Ex. | pH | Pressure mm Hg | T° boiler | % hydrolysis |
|---|---|---|---|---|
| 1 | 11.1 | 50 | 40-41°C | 11.6 |
| 2 | 9.6 | 50 | 40-41 | 13 |
| 3 | 9.2 | 50 | 40-41 | 5.75 |
| 4 | 8.6 | 50 | 40-41 | 9.4 |
| 5 | 6.8 | 50 | 40-41 | 20 |
| 6 | 6.9 | 50 | 40-41 | 17.4 |

EXAMPLES 7 to 19

An Oldershaw distillation column with 30 plates of a diameter of 30 mm is continuously fed with the mixture previously described, for examples 1–6, at the rate of 200 mls. per hour. The mean residence time in the column may be fixed as desired by the quantity of liquid in the boiler, which is equipped with a continuous withdrawal device. The distillation is carried out in such a way that the acetone and acetonitrile are eliminated at the top of the column. The operating conditions and the results obtained are set out in Table II below. The drawing shows particularly clear the minimum of the hydrolysis rates for the pH values between 8.5 and 12 in the case of a residence time in the distillation column of 30 minutes at pressures of 50, 200, and 760mm Hg.

TABLE II

| Ex. | Pressure mm Hg | Temperature of boiler °C | pH | Residence time in mins. | % Hydrolysis |
|---|---|---|---|---|---|
| 7 | 760 | 104 | 9.5 | 1 hr. 15 | 50.5 |
| 8 | 760 | 104 | 10.5 | 30 | 22 |
| 9 | 760 | 104 | 9.3 | 30 | 37 |
| 10 | 200 | 71 | 9.2 | 1 hr. 15 | 34 |
| 11 | 200 | 72 | 10.8 | 30 | 14 |
| 12 | 200 | 73 | 8.0 | 30 | 35 |
| 13 | 200 | 74 | 9.1 | 30 | 28 |
| 14 | 200 | 73 | 10.4 | 30 | 14 |
| 15 | 200 | 73 | 8.35 | 30 | 35 |
| 16 | 50 | 48 | 9.6 | 1 hr. 15 | 20 |
| 17 | 50 | 47 | 11.1 | 30 | 18 |
| 18 | 50 | 48 | 9 | 30 | 6.6 |
| 19 | 50 | 40 | 6.8 | 30 | 20 |

EXAMPLES 20 to 22:

An Oldershaw distillation column as described above was fed with a mixture resulting from ammonia, hydrogen peroxide, acetone, and acetonitrile according to the process described above in pending U.S. application Ser. No. 152,413, filed June 11, 1971, but from which the ammonia and almost all the acetone and acetonitrile have been removed. Its composition by weight is as follows: acetone 0.3 percent, acetonitrile 0.3 percent, acetonazine 31.0 percent, water 42.0 percent, acetamide 21.0 percent. The operating conditions and the results obtained are set out in Table III.

TABLE III

| Ex. | Pressure mm Hg | Temperature of boiler °C | pH | Residence time in mins. | % Hydrolysis |
| --- | --- | --- | --- | --- | --- |
| 20 | 190 | 85 | 11.0 | 40 | 3.50 |
| 21 | 180 | 85 | 6.2 | 40 | 11.80 |
| 22 | 140 | 82 | 6.5 | 40 | 11.20 |

We claim:

1. A method for the separation of ketazines from a crude synthesis mixture containing them which comprises adjusting the pH of the mixture to between about 8.5 and 12 by the addition of a base or an acid and distilling the crude reaction mixture during a period of 30 minutes or less at a reduced pressure to maintain a distillation column base temperature not exceeding about 85°C.

2. A method of claim 1 wherein the pH is brought to a value of 9 to 11.

3. A method of claim 2 wherein the mixture is distilled under a reduced pressure of 50 to 200 mm Hg.

* * * * *